United States Patent [19]

Sugier et al.

[11] 4,277,458

[45] Jul. 7, 1981

[54] PROCESS FOR OXIDIZING SULFUR AND SULFUR COMPOUNDS

[75] Inventors: Andre Sugier, Rueil; Philippe Courty, Houilles; Andre Deschamps, Noisy le Roi; Henri Gruhier, Chatillon, Bagneux, all of France

[73] Assignee: Institut Francais du Petrole, Rueil-Malmaison, France

[21] Appl. No.: 57,464

[22] Filed: Jul. 13, 1979

[30] Foreign Application Priority Data

Jul. 13, 1978 [FR] France ................. 78 21345

[51] Int. Cl.³ .............. C01B 31/20; C01B 17/50; B01D 53/34
[52] U.S. Cl. .................. 423/437; 423/244; 423/539; 252/464; 252/476
[58] Field of Search ............ 423/224, 230, 244 R, 423/535, 539, 571, 573.6, 231; 252/464, 476

[56] References Cited

U.S. PATENT DOCUMENTS

| 1,947,776 | 2/1934 | Huff et al. ................. 423/230 |
| 1,947,778 | 2/1934 | Huff et al. ................. 48/80 |
| 2,374,932 | 5/1945 | Guyer ...................... 252/464 |
| 2,581,135 | 1/1952 | Odell ..................... 423/230 X |
| 4,197,277 | 4/1980 | Sugier et al. ............... 423/231 |

FOREIGN PATENT DOCUMENTS

| 2369209 | 5/1978 | France ..................... 423/230 |
| 2373324 | 7/1978 | France ..................... 423/230 |

*Primary Examiner*—Earl C. Thomas
*Attorney, Agent, or Firm*—Millen & White

[57] ABSTRACT

A gas containing carbon oxysulfide or carbon disulfide is passed in admixture with oxygen through a catalyst formed of a carrier, vanadium oxide and silver, the proportion of iron oxide, if any, being lower than 1% by weight. The amount of vanadium oxide may be 0.5 to 10% by weight and that of silver 0.05 to 4% by weight.

14 Claims, No Drawings

PROCESS FOR OXIDIZING SULFUR AND SULFUR COMPOUNDS

This invention concerns a process for the catalytic oxidation of sulfur or polluting compounds contained in a gas.

Certain industrial gases, for example, the effluent gases from Claus units often contain, in addition to unconverted hydrogen sulfide, non-negligible amounts of carbon oxysulfide, carbon disulfide and sulfur. Such an effluent, which contains so diverse sulfur compounds, must be treated so as to contain only one species of sulfur compound, i.e. sulfur dioxide.

Certain effluents from the chemical industry contain hydrogen sulfide, sulfides and light mercaptans which are toxic and malodorant. The purification will consist in converting these compounds to sulfur and sulfur dioxide, depending on the amount of oxygen, this amount being well-known to the skilled art worker. The present process can thus be used to purify waste gases from the Claus process.

Other industrial gases contain as the essential pollutants, in addition to sulfur compounds, hydrocarbons, formaldehyde, alcohols, phenol compounds, carbon monoxide and, as a rule, organic compounds, which must be converted to non-polluting compounds such as carbon dioxide and water by complete oxidation.

The thermal incineration of compounds as above described requires high temperatures for the gas to be treated, of about 600° to 850° C.; this process also requires high oxygen amounts for good performance, which in some cases results in a high dilution and thus substantially increases the amount of gas to be preheated.

The catalytic process has the essential advantage to initiate the oxidation at a far lower temperature, possibly 150° to 200° C., particularly when the treated gas contains hydrogen sulfide; it also necessitates only low oxygen contents, say 0.8 to 7 times, for example 1.5 to 5 times, preferably 1 to 2 times the theoretical amount of oxygen necessary for the complete oxidation of S, $H_2S$, COS and $CS_2$ to $H_2O$, $SO_2$ and $CO_2$.

It has already been proposed to use catalysts of vanadium oxide associated to bauxite to effect this type of oxidation of sulfur or oxidizable sulfur compounds. Starting with sulfur, the main product is sulfur dioxide; starting with $H_2S$, COS or $CS_2$, the products are sulfur and/or sulfur dioxide, depending on the available amount of oxygen.

These catalysts can also be used to eliminate oxygen contained in low proportion in a gas containing sulfur or oxidizable sulfur compounds, as it is the case, for example, in the Claus units.

These known catalysts have however the double disadvantage of a relatively low activity, which obliges to operate at relatively low gas flow rates, and a short life.

Catalysts comprising vanadium and iron and optionally 500 to 30,000 ppm of silver and/or 1 to 20% by weight of titanium oxide have also been disclosed in two French Patent Applications Ser. No. 2,369,209 and 2,373,324.

It has been found that, when a very high activity is required for oxidizing COS and $CS_2$ to $CO_2$ and $SO_2$ at a relatively low temperature (250° to 400° C.), the catalysts of the invention can be used preferentially to these catalysts.

The catalysts of the present invention are preferably manufactured from solutions of soluble vanadium and silver compounds which are impregnated on a carrier. It is essential that these catalysts include no iron or less than 1% b.w. thereof, preferably less than 0.5% b.w. The percentage b.w. of vanadium oxide of the catalyst is preferably from 0.5 to 10% by weight, as $V_2O_5$. The content of silver is from 0.05 to 4% b.w.

The specific surface of the catalyst is advantageously higher than 10 $m^2/g$ and preferably from 50 to 350 $m^2/g$. A preferred carrier is alumina.

The active elements may be deposited on a preformed alumina carrier, for example balls of 1–15 mm diameter, or extrudates or tablets of 1–15 mm diameter, by one or more impregnations of solutions of soluble salts, or impregnated on the powdered alumina carrier and then shaped, or admixed as salts with the wet alumina carrier. Alumina may be present as gel, powder or decomposable compound.

Other useful carriers are, for example, silica, alumina-silica, calcium, barium or magnesium aluminate, refractory cements or molecular sieves.

These carriers may also be used in the monolithic shape, as honeycomb.

Vanadium is introduced, for example, in the form of vanadyl sulfate, vanadium ammonium sulfate, vanadium oxalate or ammonium metavanadate as a solution in an aqueous organic acid, or vanadic acid as a solution in an aqueous acid.

Silver may be used as any soluble silver salt, for example, silver chlorate or perchlorate; silver nitrate is however preferred.

Alumina is referred to in the following disclosure, but other carriers may be used in the same way.

When impregnating, alumina may be used as a powder; however catalysts of far higher activity and stability are obtained by using preformed alumina conglomerates, for example balls, tablets, pills or extrudates having a surface of 50 to 300 $m^2/g$ and a porosity of 0.2 to 1 $cm^3$ per gram. Balls are preferred. The conglomerates are usually obtained by agglomeration of alumina powder followed with drying and activation by heating at 500°–1000° C. They have a minimal size of 1 mm and preferably in the range of 3–6 mm.

The pore distribution of the alumina conglomerates is of importance: the catalysts of highest activity and stability (a plant of industrial size has been operated successfully over 2 and a half years) are obtained from alumina conglomerates with a pore volume of 0.4 to 0.8 $cm^3/g$ and a pore distribution corresponding to at least 0.1 ml/g of pores of diameter higher than 300 Å and at least 0.05 ml/g of pores of diameter higher than 1,000 Å.

Preferred alumina conglomerates satisfying this condition of pore distribution may be obtained by subjecting fresh alumina conglomerates having a surface of at least 120 $m^2/g$ to a treatment with steam under pressure at a temperature of 110° to 300° C., preferably 150° to 250° C., for at least 15 minutes, drying the resultant conglomerates and heating them thereafter 500°–1000° C., preferably for at least 15 minutes.

The impregnation of the catalytic elements is followed with drying, for example at 100°–300° C., then thermal activation by heating, for example at 350°–600° C., preferably 400°–550° C.

Too high temperatures, for example higher than 700° C., are preferably avoided during this activation heating, since an undesirable reaction between alumina and the active elements could otherwise take place, which would decrease the activity and stability of the catalyst.

These catalysts may be used at temperatures higher than 150° C., for example at 200°–700° C. and preferably 300°–600° C. The catalysts are preferably used in such amounts that the VVH be from 1,000 to 30,000 and usefully from 2,000 to 10,000 (VVH = volume of treated gas per volume of catalyst per hour).

According to the invention, air may be introduced at one single point of the plant or preferably at several points, which is more advantageous, so as to limit any local overheating; this may be obtained, for example, by dividing the catalyst bed into several sections.

The following catalysts C and D are given for illustrative purposes and must in no case limit the scope of the invention. Catalysts A and B, prepared according to the aforementioned prior art patents are included to exemplify the state of the art.

CATALYST A 5,400 ml of an aqueous solution obtained by dissolution of 510 g of ammonium metavanadate, 650 g of oxalic acid and then 1,650 g of iron nitrate into water are used to impregnate 10 kg of alumina balls of 3–5 mm diameter, 95 m²/g specific surface and 57 ml/100 g total pore volume.

After impregnation, drying is performed for 2 h at 250° C., and then heating for 4 h at 550° C. in the presence of air.

Resultant catalyst A has the following composition in % b.w.:

$Al_2O_3$ carrier: 93.2; $V_2O_5$: 3.8; $Fe_2O_3$: 3.0

The specific surface is 87 $m^2 g^{-1}$.

The starting alumina balls, which comprised 0.16 ml/g of pores greater than 300 Å and 0.11 ml/g of pores greater than 1,000 Å, had been obtained from freshly prepared alumina balls by heating for 4 h at 220° C. in an autoclave, in the presence of saturated steam, followed with calcining at 700° C. for 4 h.

CATALYST B 1 kg of catalyst A as previously described is impregnated with 540 ml of a solution containing 6.3 g of silver nitrate; it is then dried at 200° C. for 2 hours and treated for 4 h at 550° C. in the air.

The weight of silver thus deposited is 4 g, i.e. a proportion of about 0.4% b.w., the proportions of the other components being substantially unchanged.

The specific surface is 92 $m^2 g^{-1}$.

CATALYST C 51 g of ammonium metavanadate and 90 g of oxalic acid are dissolved under stirring into 300 ml of water at 30° C. After one hour, 6.3 g of silver nitrate in a mixture of 20 ml pure nitric acid and 140 ml water is added. The resultant solution is used to impregnate 1 kg of alumina balls identical to those used for preparing catalyst A.

Impregnation is followed with drying at 250° C. for 2 hours and then heating for 4 h at 550° C. in the presence of air. Resultant catalyst C has the following composition in % b.w.:

Alumina carrier: 95.8; $V_2O_5$: 3.8; Ag: 0.4.

The specific surface is 93 $m^2 g^{-1}$.

CATALYST D

This catalyst is prepared in the same way as catalyst C except that there is used 16 g of silver nitrate per kg of the alumina carrier.

After treatment at 550° C., the resultant catalyst has the composition (in % b.w.): $Al_2O_3$: 95.3; $V_2O_5$: 3.7; Ag: 1.

The specific surface is 93 $m^2 g^{-1}$.

CATALYST E 51 g of ammonium metavanadate and 90 g of oxalic acid are dissolved by stirring in 380 ml water at 30° C. After one hour, a solution of 6.3 g silver nitrate in a mixture of 20 ml pure nitric acid and 140 ml water is added.

The resulting solution is used to impregnate 1 kg of aluminasilica extrudates containing by weight 90% of $SiO_2$ and 10% of $Al_2O_3$ and having a specific surface of 195 $m^2 g^{-1}$ and a total pore volume of 64 ml/100 g.

After impregnation, the material is dried at 250° C. for 2 hours and then heated at 550° C. for 4 hours in the presence of air.

Resultant catalyst E has the following composition in % by weight.:

$SiO_2$: 86.2; $Al_2O_3$: 9.6; Ag: 0.4; $V_2O_5$: 3.8.

The specific surface is 152 $m^2 g^{-1}$.

CATALYST F

An impregnation solution is prepared, as for catalyst E, except that the resultant solution is used to impregnate 1 kg of silica tablets having a specific surface of 240 $m^2 g^{-1}$ and a total pore volume of 66 ml/100 g.

Drying and heating are effected as for catalyst E. Catalyst F has the following composition by weight:

$SiO_2$: 95.8%; Ag: 0.4; $V_2O_5$: 3.8.

EXAMPLE 1

10,000 Nm³/hour of waste-gas from a Claus unit, whose composition by volume is as follows:

| | |
|---|---|
| $SO_2$ | 0.4% |
| $H_2S$ | 0.8 |
| $CS_2$ | 0.1 |
| COS | 0.4 |
| S (vapor + droplets) | 0.15 |
| $H_2O$ | 29 |
| $CO_2$ | 5 |
| $H_2$ | 1 |
| $N_2$ | 63.15 | are heated by admixture with combustion gas from an auxiliary burner and introduced with an air excess of about 20% into a post-combustion chamber (incinerator) whose volume is 3 m³ and where a catalyst has been placed. Taking the addition of air and combustion gas into account, the gas flow rate at the outlet from the incinerator is about 13,000 m³ per hour at 300° C.

Depending on the working conditions in the incinerator (temperature in °C., nature of the catalyst), the following results have been noted for the composition of the effluent at the outlet, the volume of catalyst being 2 m³.

The results are given in Table I

Table I shows that, at moderate temperature (300° to 400° C.), the alumina-containing catalyst of the invention (catalyst C or D) is more active than the known catalyst with respect to COS and $CS_2$, even though it is less active with respect to $H_2S$. It can thus be used to treat a gas containing substantial amounts of COS and $CS_2$, either alone or associated with the catalyst of the prior art.

When the carrier is silica or alumina-silica, the results are not so good as with alumina, although they are better than those obtained with catalysts of V Fe or V Fe Ag deposited on silica or alumina-silica.

EXAMPLE 2

A long duration test is carried out with the catalyst under the same operating conditions and with the same waste-gas as in the above example.

The following results have been obtained after 3,000 hours:

TABLE I

| Content of pollutants | CATALYST C T = 300 | CATALYST C T = 400 | CATALYST E T = 300 | CATALYST E T = 400 | CATALYST F T = 300 | CATALYST F T = 400 |
|---|---|---|---|---|---|---|
| $H_2S$ | 45 | <5 | 35 | <5 | 35 | <5 |
| $CS_2$ | 110 | 30 | 80 | 20 | 75 | 20 |
| COS | 290 | 60 | 220 | 40 | 210 | 36 |
| S | 40 | <5 | 40 | <5 | 35 | <5 |

These results show that catalysts E and F are less sensitive to ageing than catalyst C. This result can be explained as follows: the analysis of catalysts E and F shows that the content by weight of sulfate, expressed as $SO_3$, after 3,000 hours of run, is low and respectively 0.1 and 0.3%, while it is larger with catalyst C (1.5%).

TABLE II

| Content of pollutants (2) | CATALYST A T = 300 (1) | CATALYST A T = 400 | CATALYST B T = 300 | CATALYST B T = 400 | CATALYST C T = 300 | CATALYST C T = 400 | CATALYST D T = 300 | CATALYST D T = 400 | CATALYST E T = 300 | CATALYST E T = 400 | CATALYST F T = 300 | CATALYST F T = 400 |
|---|---|---|---|---|---|---|---|---|---|---|---|---|
| $H_2S$ | 50 | <5 | 15 | <5 | 25 | <5 | 20 | <5 | 30 | <5 | 34 | <5 |
| $CS_2$ | 450 | 150 | 100 | 20 | 60 | 15 | 35 | <10 | 70 | 20 | 90 | 25 |
| COS | 600 | 240 | 250 | 70 | 180 | 30 | 120 | 15 | 200 | 35 | 230 | 40 |
| S | 200 | <5 | 30 | <5 | 30 | <5 | 30 | <5 | 30 | <5 | 30 | <5 |

(1) Temperature in °C.
(2) ppm by volume.

What is claimed is:

1. A catalytic process for directly converting any carbon oxysulfide and carbon disulfide in a gas containing at least one of the same to carbon dioxide and sulfur dioxide in a single step, which process comprises contacting a gas containing oxygen and at least one of carbon oxysulfide and carbon disulfide with a substantially iron-free catalyst comprising a carrier, vanadium oxide and silver.

2. A process according to claim 1, wherein the carrier is alumina and the respective contents of vanadium oxide and silver are from 0.5 to 10% by weight of vanadium oxide as $V_2O_5$ and from 0.05 to 4% by weight of silver.

3. A process according to claim 1, wherein the specific surface area of the catalyst is from 50 to 350 m²/g.

4. A process according to claim 1, wherein the catalyst is obtained by impregnating alumina with an aqueous solution of a vanadium compound and a silver compound, drying the impregnated alumina, and thermally activating the dried catalyst.

5. A process according to claim 1 which is effected at a temperature from 250° to 400° C.

6. A process according to claim 1, wherein the gas also contains hydrogen sulfide.

7. A process according to claim 1, wherein the catalyst consists essentially of a carrier, vanadium oxide and silver.

8. A process according to claim 1, wherein the vanadium oxide is $V_2O_5$.

9. A process according to claim 2, wherein the alumina carrier has a specific surface area of from 50 to 300 m²/g and a porosity of from 0.2 to 1 cm³/g.

10. A process according to claim 9, wherein the alumina carrier is in the form of balls of from 3 to 6 mm in size, having a pore volume of from 0.4 to 0.8 cm³/g and a pore distribution corresponding to at least 0.1 ml/g of pores of diameter higher than 300 angstroms and at least 0.05 ml/g of pores of diameter higher than 1,000 angstroms.

11. A process according to claim 4, wherein the impregnated alumina is dried at from 100° to 300° C., and the dried catalyst is thermally activated at from 350° to 600° C.

12. A process according to claim 1, wherein the volume of gas treated per volume of catalyst per hour is from 2,000 to 10,000.

13. A process according to claim 10, wherein the vanadium oxide and the silver are present on the alumina as an intimate mixture, the resultant catalyst containing, by weight, 95.8% alumina carrier, 3.8% $V_2O_5$ and 0.4% Ag.

14. A process according to claim 10, wherein the vanadium oxide and the silver are present on the alumina as an intimate mixture, the resultant catalyst containing, by weight, 95.3% $Al_2O_3$, 3.7% $V_2O_5$ and 1% Ag.

* * * * *